Oct. 13, 1942.   H. THOMMEN   2,298,517
PROTECTION OF MULTIPHASE TRANSMISSION LINES
Filed Feb. 6, 1940
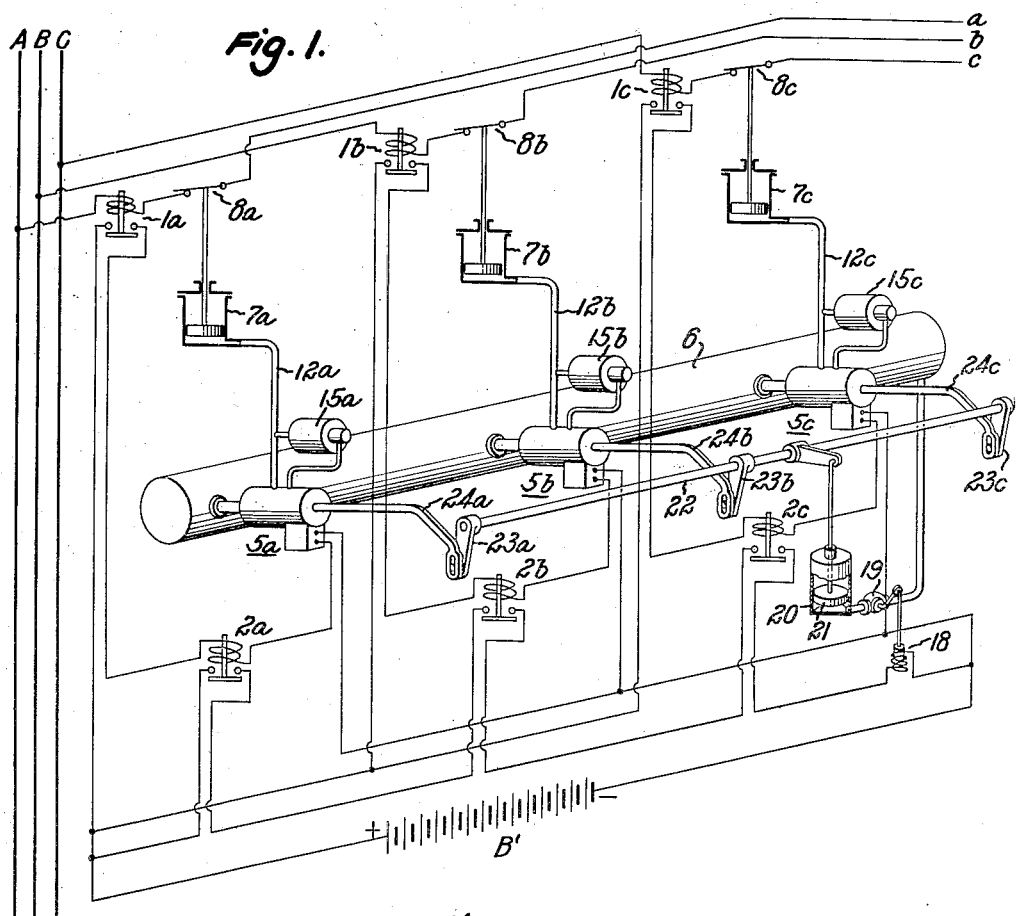
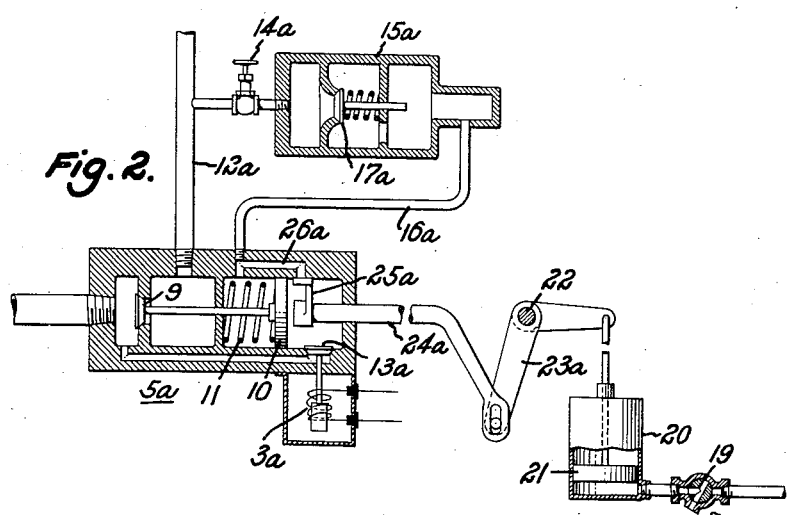

Patented Oct. 13, 1942

2,298,517

UNITED STATES PATENT OFFICE 2,298,517

PROTECTION OF MULTIPHASE TRANSMISSION LINES

Hans Thommen, Baden, Switzerland, assignor to Aktiengesellschaft Brown, Boveri & Cie., Baden, Switzerland Application February 6, 1940, Serial No. 317,605
In Germany November 17, 1938

3 Claims. (Cl. 175—294)

This invention relates to the protection of multi-phase transmission lines comprising three or more phases from damage arising from arcing short circuits to ground.

A method for the protection of multi-phase transmission lines having quick-acting reclosing circuit breakers in each phase is already known. In view of the much greater number of single phase disturbances in multi-phase transmission networks as compared with disturbances which affect all the phases simultaneously, it has already been proposed to individually control the circuit breakers in each phase by means of relays in such a way that in any disturbance only the circuit breaker of the phase or phases on which a fault occurs is actuated. In this method a synchronizing force is maintained in the phases which are not disturbed so that the danger of the network falling out of phase is minimized.

It has been found that a longer time is required for de-ionization of the arc in the case of single phase short circuits than in the case of disturbances in a plurality of phases.

The present invention is an improvement in the protection of multi-phase circuits against disturbances by arcing shorts which comprises increasing the period between opening and reclosing the line in the case of disturbances in a single phase as compared with the period between opening and reclosing in the case of simultaneous disturbances on more than one or on all of the phases.

The invention may be carried out by including in the regulating mechanism for the circuit breakers an auxiliary time delay device in such a manner that the auxiliary time delay device comes into action only when the circuit breaker of only a single phase is actuated and is uneffective when a disturbance occurs in a plurality of phases. In this manner, the inclusion of the additional time delay in the reclosing mechanism depends upon the character of the disturbance and the period for de-ionization of the arc is adapted to the nature of the circuit breaking operation.

The time delay device may comprise any known device such as clockwork, mechanical or electrical damping device, or the like. The operation of the circuit breaker mechanisms can be effected in known manner pneumatically, electrically, electro-pneumatically or by remote control.

In the accompanying drawing which illustrates one embodiment of the invention:

Fig. 1 is a schematic view of a multiphase protective system in which the timing mechanism for delaying the reclosure of the several circuit breakers is rendered inoperative in the case of faults affecting a plurality of phases; and Fig. 2 is a transverse sectional view through the control mechanism of one phase and the control mechanism that is common to a plurality of phases.

In Fig. 1 the reference characters A, B, and C indicate the feeders of a three phase system to which the branch lines $a$, $b$, $c$, respectively, are connected. The control mechanism for each feeder line is of identical design and the reference numerals for the corresponding elements of the several phases are distinguished from each other by letters indicative of the respective phases. For simplicity of description, only the control apparatus of branch line $a$ will be described in detail, it being understood that similar equipment is associated with branch lines $b$ and $c$.

The usual over-current relay $1a$ is included in branch $a$ to complete a series circuit from a local direct current source B' through the winding of a relay $2a$ and the winding $3a$ of an electrically operated valve $4a$ of an electro-pneumatic relay $5a$ when the current flow in branch line $a$ exceeds some predetermined value.

The relay $5a$ controls the supply of air under pressure from a storage tank 6 to the operating cylinder $7a$ of an air-blast circuit breaker $8a$ in the branch line $a$. As shown in Fig. 2, the relay $5a$ comprises a valve 9 that is carried by a piston 10 and normally retained in closed position by a spring 11 to block pressure flow from the reservoir 6 to the conduit $12a$. The pilot or control valve $13a$ is opened, upon current flow through the winding $3a$, to admit pressure air to the rear of the piston 10, and the resulting movement of the latter opens the valve 9 to admit pressure air to the conduit $12a$. The conduit $12a$ opens into the operating cylinder $7a$ of the circuit breaker and, through an adjustable throttling valve $14a$, into the chamber $15a$ of time delay mechanism that determines the reclosing of the circuit breaker $8a$. A pipe $16a$ connects the rear end of chamber $15a$ to the relay $5a$ at a point in advance of the piston 10, but air flow through this pipe is normally blocked by a spring pressed valve $17a$. The valve $17a$ opens when the pressure builds up in the forward end of chamber $15a$, and thus establishes the same pressure at opposite sides of the piston 10, thereby permitting the spring 11 to close the valve 9 that admits pressure air to the conduit $12a$. The pilot valve $13a$ had already closed as the relay circuit through the winding 3a was opened at the relay 1a when the circuit breaker 8a opened. The interruption of the supply of pressure air to the operating cylinder 7a results in the reclosure of the circuit breaker 8a by spring or pneumatic means, not shown, as the pressure fluid within the cylinder 7a escapes to atmosphere through the gap between the separated contacts of an air blast circuit breaker.

The interval between the opening and the reclosure of a single circuit breaker is determined by the rate at which the pressure air flows into the chamber 15a of the time delay mechanism. In accordance with this invention, additional control mechanism is provided to obtain a more rapid reclosing when a plurality of the circuit breakers open in response to a fault on more than one phase. The normally open contacts of the relays 2a, 2b, 2c of the control circuits of the several phases are included, in series, in a circuit from the current source B' to the operating winding 18 of the valve 19 in the pressure supply line to cylinder 20. The piston 21 is connected to a crank arm on the rock shaft 22 which has crank arms 23a—23c for operating the slide rods 24a—24 of the respective relays 5a, 5b, 5c. As shown in Fig. 2, the rod 24a carries a slide valve 25a that normally closes the passage 26a which opens into the operating cylinder at opposite sides of the piston 10. Valve 25a is shifted to the right upon a counterclockwise movement of rockshaft 22 when pressure air is admitted to the cylinder 20 below the piston 21, and the same action takes place in the relays 5b and 5c. The time delay mechanisms of the several circuit breakers are thus rendered ineffective as the pressures at the opposite faces of the pistons 10 are equalized by the opening of the slide valves, and the springs 11 then force the pistons 10 into normal position to close the main valves 9.

A fault on any one phase will energize the overload relay of that phase, for example the relay 1a of the line a. The associated relay 2a is closed and current is supplied to the winding 3a to open the pilot valve 13a of relay 5a. The main valve 9 then opens and pressure air flows through conduit 12a to the operating cylinder 7a of the circuit breaker 8a, and to chamber 15a of the time delay mechanism. The circuit breaker 8a opens to interrupt current flow on line a, and recloses again when the pressure in chamber 15a builds up to that value which will open the valve 17a. In the case of a fault that affects all of the branch lines, the control circuits of all phases are energized and all of the circuit breakers are opened. The simultaneous energization of the relays 2a, 2b, 2c completes the circuit of the valve-operating winding 18, and pressure air flows into cylinder 20 to lift the piston 21 and thereby shift the slide valves to open position. The resultant equalization of the pressures acting on the several pistons 10 permits the reclosure of the main valves 9 by springs 11, and the several circuit breakers then reclose without awaiting the expiration of the time delay interval.

The illustrated circuit for the valve-operating winding 18 requires the energization of the three relays 2a, 2b and 2c, but it will be apparent that these relays may be provided with a plurality of sets of contacts for completing alternative circuits for the winding 18 upon the simultaneous energization of any two of the relays.

It is to be understood that the invention is not restricted to the electro-pneumatic type of control system as other systems have been or may be used with the individual phases. The invention contemplates the addition to a protective system in which reclosing circuit breakers are individually controlled by a fault condition on the associated phase, of a further control for obtaining a more rapid reclosure when a plurality of the circuit breakers are opened simultaneously.

I claim:

1. A protective system for a multiphase transmission line comprising a reclosing circuit breaker for each phase, relay mechanism individual to the several phases for selectively opening the circuit breaker of a phase on which a fault occurs, timing mechanism individual to each circuit breaker for delaying the reclosure thereof, and means responsive to the simultaneous energization of a plurality of said relay mechanisms to render said timing mechanisms inoperative, thereby to provide a longer period of deionization when a single phase is opened than when a plurality of phases are opened.

2. In a system for the protection of a multiphase transmission line, a reclosing circuit breaker for each phase, means individual to each circuit breaker for opening the same, timing means individual to each circuit breaker for delaying the reclosure thereof, an overload relay on each phase, a relay circuit controlled by each overload relay, each relay circuit including an auxiliary relay and means for energizing the opening means of the circuit breaker of the associated phase, an additional relay circuit energized by the simultaneous energization of a plurality of said auxiliary relays, and means controlled by said additional relay circuit for rendering inoperative the timing means of the several circuit breakers.

3. In a system for the protection of a multiphase transmission line, the combination with a reclosing circuit breaker for each phase, and means individual to each circuit breaker for opening and for reclosing the same, said means including for each circuit breaker timing means to delay the reclosure of the circuit breaker for a preselected interval, of means responsive to simultaneous faults on a plurality of phases for rendering said timing mechanisms inoperative to delay the reclosures of the associated circuit breakers.

HANS THOMMEN.